US012080141B2

(12) United States Patent
Roark et al.

(10) Patent No.: US 12,080,141 B2
(45) Date of Patent: Sep. 3, 2024

(54) SYSTEM AND METHOD FOR DETECTING AND CONFIRMING FALL EVENTS

(71) Applicant: ZEBRA TECHNOLOGIES CORPORATION, Lincolnshire, IL (US)

(72) Inventors: Charles W. Roark, Frisco, TX (US); Allan Perry Herrod, Mission Viejo, CA (US); Adithya H. Krishnamurthy, Hicksville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 94 days.

(21) Appl. No.: 18/070,750

(22) Filed: Nov. 29, 2022

(65) Prior Publication Data

US 2024/0177587 A1 May 30, 2024

(51) Int. Cl.
*A61B 5/11* (2006.01)
*G08B 21/04* (2006.01)

(52) U.S. Cl.
CPC ................................ *G08B 21/0476* (2013.01)

(58) Field of Classification Search
CPC ... G08B 21/0476; G08B 21/02; A61B 5/1117; G06N 3/08
See application file for complete search history.

(56) References Cited

U.S. PATENT DOCUMENTS

| | | | | |
|---|---|---|---|---|
| 11,170,295 | B1 * | 11/2021 | Carmichael | G06N 3/084 |
| 11,796,637 | B1 * | 10/2023 | Shah | G01S 7/412 |
| 11,906,540 | B1 * | 2/2024 | Gwin | G06N 20/20 |
| 2015/0145662 | A1 * | 5/2015 | Barfield, Jr. | G08B 21/0492 340/436 |
| 2015/0194034 | A1 * | 7/2015 | Shim | A61B 5/0077 348/77 |
| 2022/0036716 | A1 * | 2/2022 | Greenwood | G06N 3/02 |
| 2022/0110545 | A1 * | 4/2022 | Greenwood | A61B 5/1117 |
| 2022/0230746 | A1 * | 7/2022 | Anthapur | G08B 21/0415 |
| 2022/0280047 | A1 * | 9/2022 | Stadler | A61N 1/3993 |
| 2023/0326318 | A1 * | 10/2023 | Saavedra | G08B 21/0453 |

* cited by examiner

*Primary Examiner* — An T Nguyen

(57) ABSTRACT

An example server includes a memory configured to store sensor data from a plurality of sensors in a facility; a communications interface; and a processor interconnected with the memory and the communications interface, the processor configured to: in response to receiving, via the communications interface, an event indicator from a source sensor of a client device: identify a subset of the plurality of sensors based on the event indicator; retrieve and correlate the sensor data from the identified subset of the plurality of sensors in the facility; detect a candidate event associated with a user of the client device from the correlated sensor data; and when the candidate event is detected, send an event notification to the client device.

20 Claims, 6 Drawing Sheets

SYSTEM AND METHOD FOR DETECTING AND CONFIRMING FALL EVENTS

BACKGROUND

Busy enterprises may have many people working on various tasks within a facility. Enterprises may use device-integrated and fixed sensors to detect fall events experienced by users. However, sensor data corresponding to a fall event experienced by the device may not be directly correlated to a user experiencing an associated fall event, and hence may lead to falsely identifying fall events or missing fall events.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
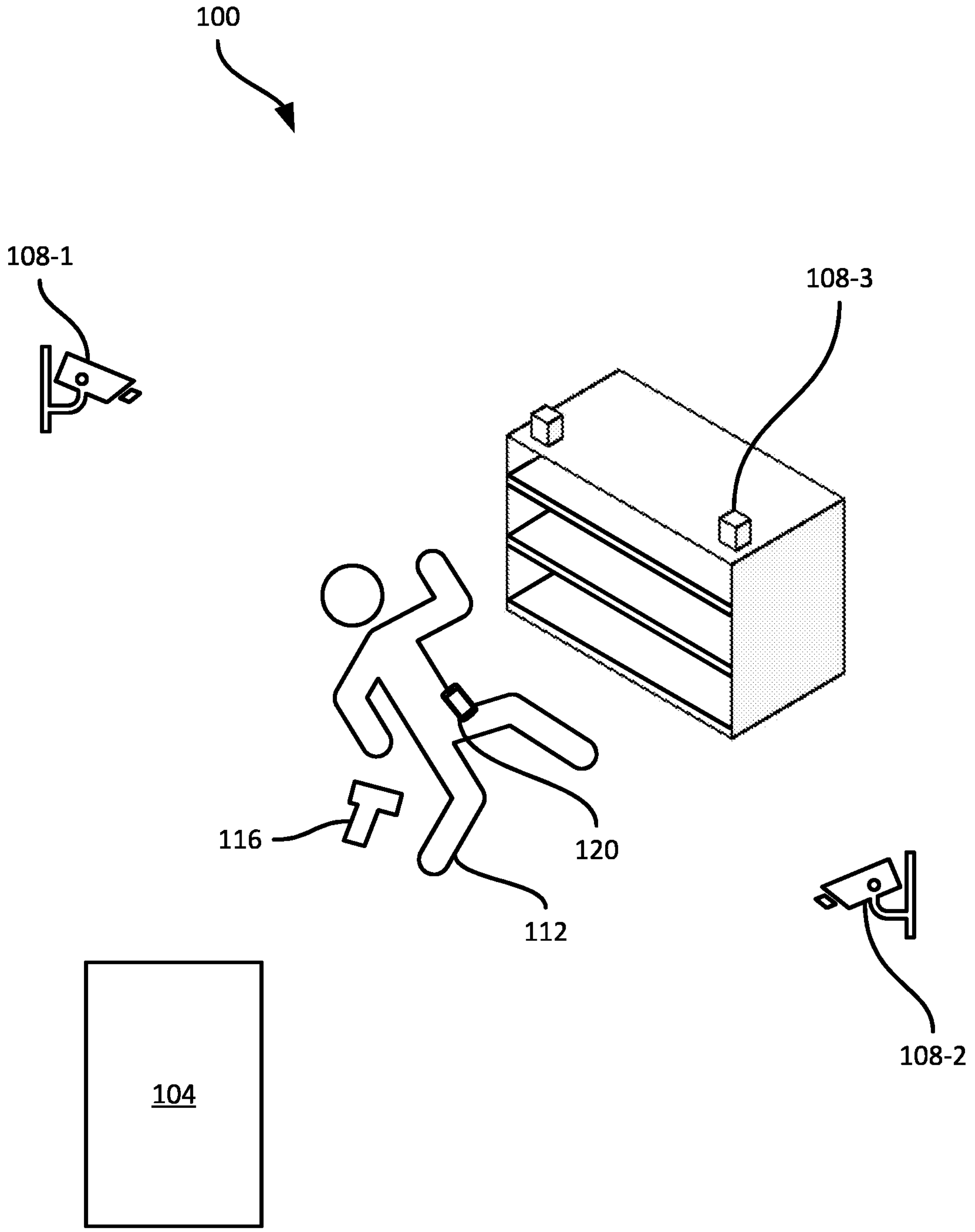
FIG. 1 is a schematic diagram of a system for detecting and confirming fall events.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a server comprising a memory configured to store sensor data from a plurality of sensors in a facility; a communications interface; and a processor interconnected with the memory and the communications interface, the processor configured to: in response to receiving, via the communications interface, an event indicator from a source sensor of a client device: identify a subset of the plurality of sensors based on the event indicator; retrieve and correlate the sensor data from the identified subset of the plurality of sensors in the facility; detect a candidate event associated with a user of the client device from the correlated sensor data; and when the candidate event is detected, send an event notification to the client device.

Additional examples disclosed herein are directed to a method comprising storing sensor data from a plurality of sensors in a facility; in response to receiving an event indicator from a source sensor of a client device: identifying a subset of the plurality of sensors based on the event indicator; retrieving and correlating the sensor data from the identified subset of the plurality of sensors in the facility; detecting a candidate event associated with a user of the client device from the correlated sensor data; and when the candidate event is detected, sending an event notification to the client device.

FIG. 1 depicts a system 100 for detecting and confirming an event in accordance with the teachings of this disclosure. The system 100 may be implemented in a facility, such as a warehouse, a manufacturing facility, a healthcare facility, or the like. The system 100 includes a server 104 in communication with a plurality of sensors, of which three example sensors 108-1, 108-2, and 108-3 are depicted (the sensors may be referred to herein generically as a sensor 108 and collectively as the sensors 108; this nomenclature is also used elsewhere herein) distributed around the facility.

The sensors 108 may be in communication with the server 104 via communication links including wireless links. For example the wireless links may be provided by a wireless local area network (WLAN) deployed by one or more access points (not shown). In other examples, the server 104 may be located remotely from the facility and the communication links may therefore include one or more wide-area networks such as the Internet, mobile networks, and the like.

The system 100 is deployed to detect an event, and in particular a user-based fall safety event, such as a user 112 experiencing a major or minor fall event, a near-miss event (e.g., a slip or trip with no associated fall event, or the like), environmental factors contributing to a fall hazard, and the like. In particular, the server 104 may collect sensor data from the sensors 108 and correlate the sensor data to detect or predict fall events.

The sensors 108 may therefore able to collect sensor data representing the facility. The sensors 108 may include cameras configured to capture image data representing the facility (e.g., sensors 108-1, 108-2, including optical cameras, LIDAR cameras, video cameras, and the like), product sensors configured to capture product-specific data (e.g., RFID tags and readers, product-directed imaging devices or other sensors, and the like), temperature sensors, microphones, and other suitable sensors. One such sensor 108-3 is depicted in FIG. 1.

In some examples, the sensors from which the server 104 obtains data may be integrated into computing devices, such as a barcode scanner 116 and a mobile device 120. In other examples, the sensors may be integrated into other computing devices, such as tablets, laptops, handheld computing devices, dimensioning devices, and the like, which may be operated by the user 112 or other users in the facility. In further examples, the sensors may be integrated into other stationary or mobile equipment around the facility, such as a mobile robot, a desktop computer, and the like. The sensors integrated with the barcode scanner 116 and the mobile device 120 may include accelerometers, imaging devices (e.g., integrated cameras and the like), microphones, and the like.

That is, the sensors 108 and the devices such as the barcode scanner 116 and the mobile device 120 may be sensors and devices which are distributed around the facility for regular facility operations. For example, the barcode scanner 116 may be used by the user 112 to scan products being stocked and/or retrieved, while the mobile device 120 may be assigned to the user 112 to receive and track tasks assigned to the user 112.

In operation, the sensors 108, including the sensors integrated with the barcode scanner 116 and the mobile device 120 may regularly capture sensor data over their regular course of operation based on their functions within the facility. The sensors 108 may send the captured sensor data to the server 104 for storage. When a source sensor captures sensor data representing a potential event, the source sensor may send an event indicator to the server 104. In response to receiving the event indicator, the server 104 may retrieve and correlate sensor data from an appropriate subset of the sensors 108. The server 104 may analyze the correlated sensor data to identify or detect a candidate event (i.e., an event as detected and supported by sensor data from a plurality of sensors including the source sensor). The server 104 may then confirm the candidate event, for example by sending an event confirmation request to a device associated with a user experiencing the candidate event.

Figure 2:
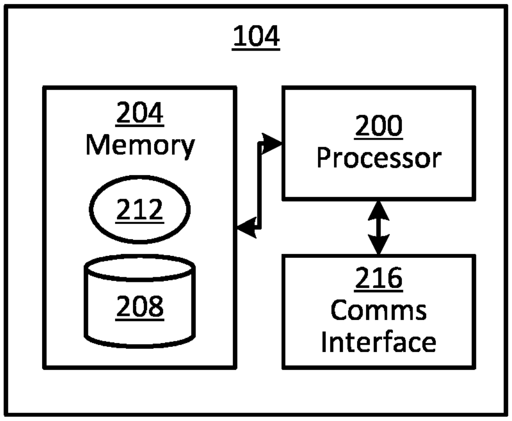
FIG. 2 is a block diagram of certain internal hardware components of the server of FIG. 1.

Turning now to FIG. 2, certain internal components of the server 104 are illustrated. The server 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores an application 208 which, when executed by the processor, configures the processor 200 to perform various functions discussed below in greater detail and related to the fall event detection operation of the server 104. The application 208 may also be implemented as a suite of distinct applications. The memory 204 also stores a repository 212 storing rules and data for the fall event detection operation. For example, the repository 212 may store sensor data, annotated sensor data, and the like.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the operations discussed herein.

The server 104 also includes a communications interface 216 enabling the server 104 to exchange data with other computing devices such as the sensors 108, the barcode scanner 116, and the mobile device 120. The communications interface 216 is interconnected with the processor 200 and includes suitable hardware (e.g. transmitters, receivers, network interface controllers and the like) allowing the server 104 to communicate with other computing devices. The specific components of the communications interface 216 are selected based on the type of network or other links that the server 104 is to communicate over. The server 104 can be configured, for example, to communicate with the sensors 108, the barcode scanner 116, and the mobile device 120 using the communications interface 216 to receive sensor data captured at the respective sensors 108, barcode scanner 116, and mobile device 120 to confirm candidate fall events.

Figure 3:
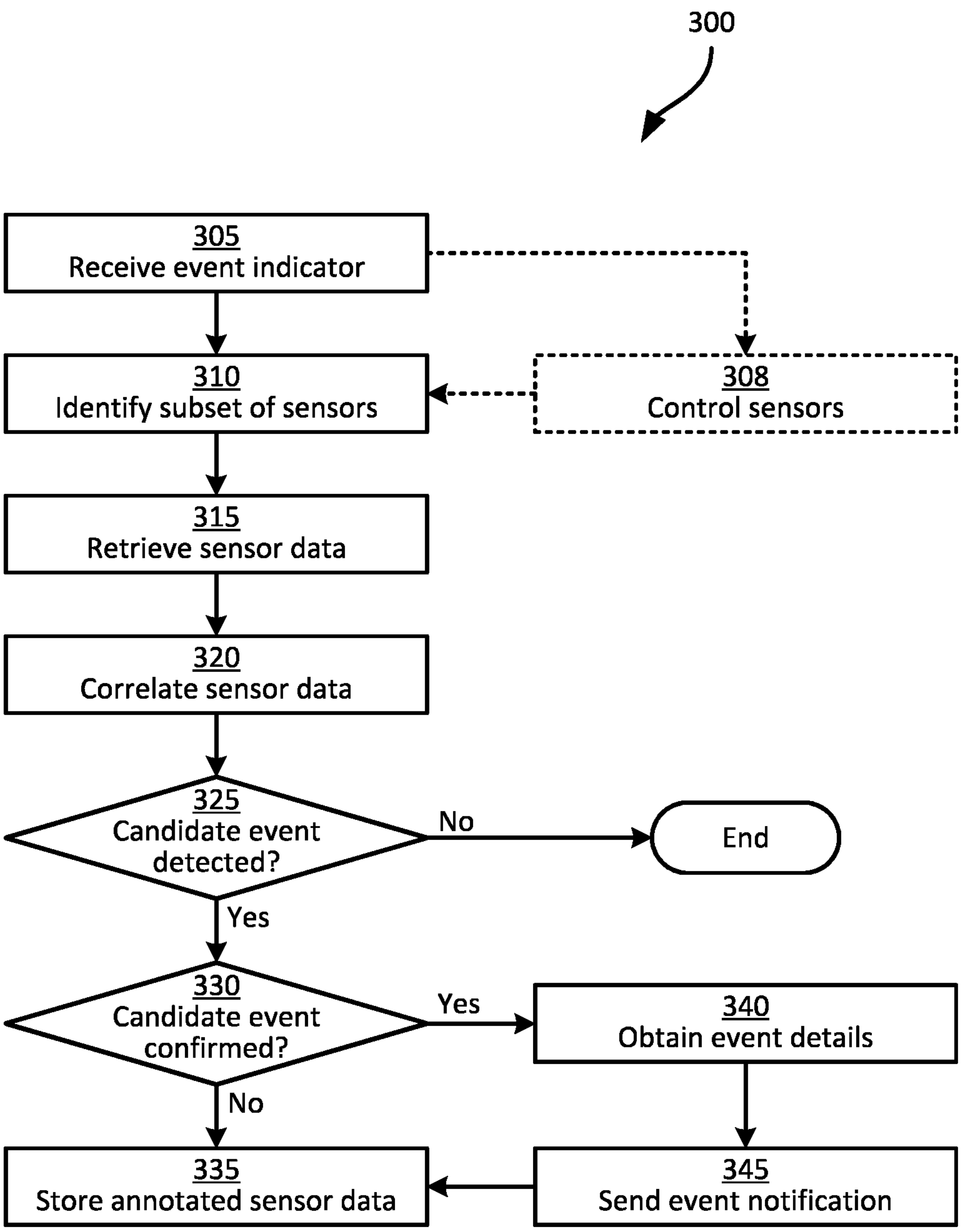
FIG. 3 is a flowchart of a method for detecting and confirming fall events.

Turning now to FIG. 3, the functionality implemented by the server 104 will be discussed in greater detail. FIG. 3 illustrates a method 300 of detecting and confirming an event. The method 300 will be discussed in conjunction with its performance in the system 100, and particularly by the server 104, via execution of the application 208. In particular, the method 300 will be described with reference to the components of FIGS. 1 and 2. In other examples, the method 300 may be performed by other suitable devices or systems.

The method 300 is initiated at block 305, where the server 104 receives an event indicator from a source sensor. The event indicator indicates a potential fall event as detected by the source sensor. For example, the source sensor may be an accelerometer detecting changes in acceleration known to correspond with a freefall event (i.e., when an object is dropped freely).

The source sensor may therefore be one of the sensors 108 having a dedicated processor and/or controller (e.g., internal to the source sensor) capable of monitoring the sensor data to detect data representative of a potential event. For example, the source sensor may be a sensor integrated with the barcode scanner 116 or the mobile device 120. In other examples, the sensor data captured at the sensors 108 may be sent to the server 104 for storage (e.g., in the repository 212), and the server 104 may periodically monitor at least a portion stored sensor data for potential fall events.

In response to detecting the potential event, the source sensor may send an event indicator to the server 104. The event indicator may include a timestamp of the potential event, as well as a location of the event and/or the source sensor. For example, the location of the source sensor may be determined based on a fixed location of the sensor, an internal location tracking system of the source sensor (e.g., relative to the location within the facility), triangulated based on wi-fi signal strengths from nearby access points, or other suitable mechanisms.

The event indicator may further include other relevant sensor data, such as a type of sensor and/or device, a state of the sensor and/or device (e.g., fixed, carried, holstered, in pocket, etc.) and the like.

At block 310, the server 104 identifies a subset of sensors for which to retrieve sensor data. In particular, the server 104 may select the subset of sensors based on the location specified in the event indicator received at block 305. For example, the server 104 may select sensors 108 within a threshold distance of the location specified in the event indicator.

In other examples, the server 104 may identify sensors 108 capable of capturing sensor data representing the location specified in the event indicator. For example, for sensors 108 capturing audio data, sensors eligible to be included in the subset may simply be sensors 108 within a threshold distance of the location. In other examples, the threshold distance may be dynamic based on the parameters of the sensor 108 capturing the audio data (i.e., based on the sensitivity of each individual sensor 108). For sensors 108 capturing image data, the server 104 may additionally consider the field of view (FOV) of the sensor 108.

Figure 4:
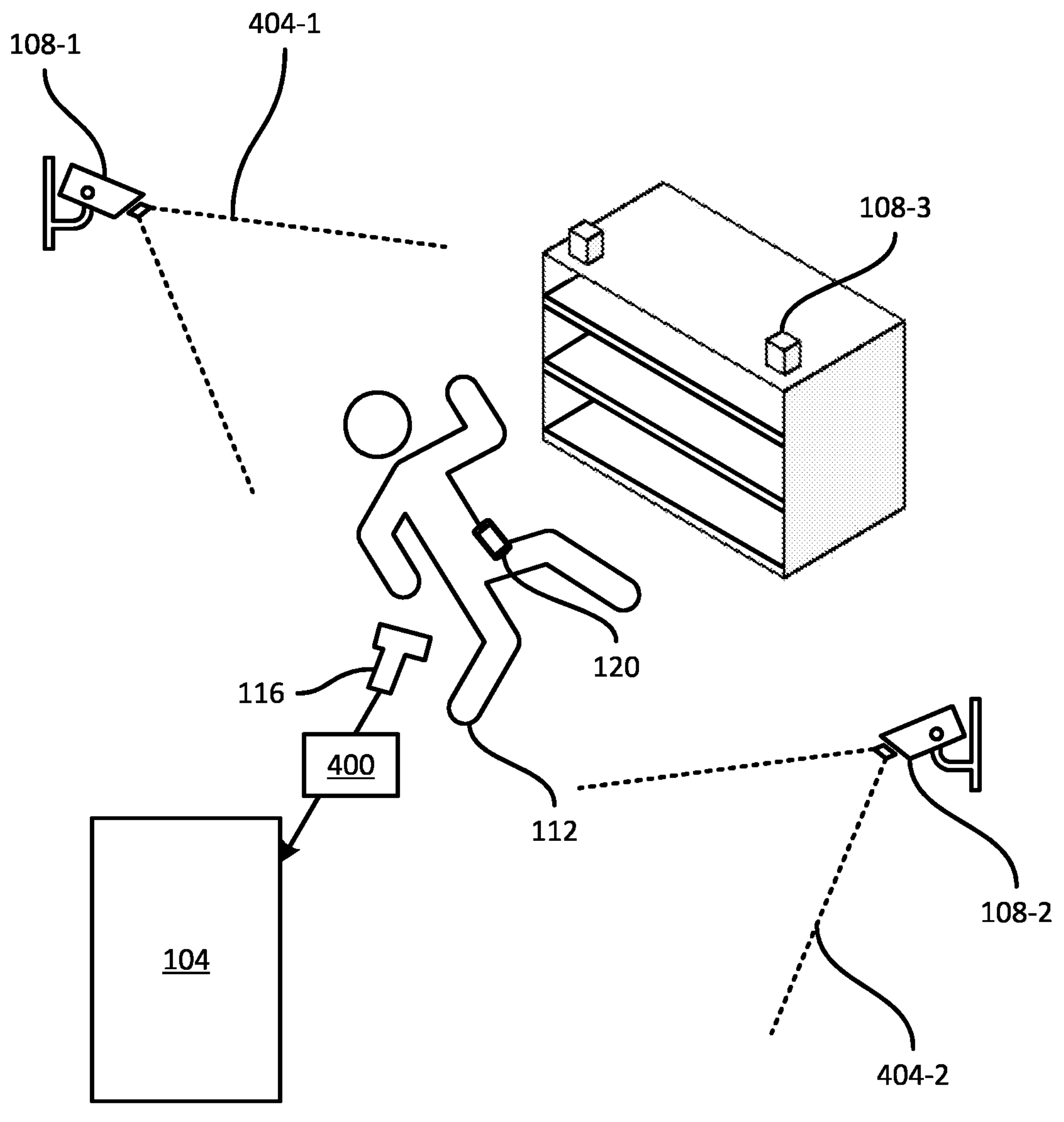
FIG. 4 is a schematic diagram of an example performance of block 305 of the method of FIG. 3.

For example, referring to FIG. 4, during a fall event, the user 112 may drop the barcode scanner 116. Accordingly, the barcode scanner 116 may detect a freefall event (e.g., via an internal accelerometer or the like), and send an event indicator 400 to the server 104. The event indicator 400 may include a location of the barcode scanner 116 at the time the event indicator 400 was generated. For example, the location of the barcode scanner 116 within the facility may be tracked via internal systems of the barcode scanner 116, via triangulation of Wi-Fi or other wireless communication signals, via global positioning systems, or the like. The event indicator 400 may further include a timestamp indicating the time the barcode scanner 116 detected the freefall event.

Since the barcode scanner 116 is mobile and associated with the user 112, the server 104 may associate the location of the barcode scanner 116 with the user 112. Accordingly, the server 104 may identify sensors 108 capable of capturing sensor data representing the location of the barcode scanner 116 and specified in the event indicator 400. The first camera 108-1 may have a FOV 404-1 which captures the barcode scanner 116. The second camera 108-2 may have a FOV 404-2 which does not capture the barcode scanner 116. The sensor 108-3 may have its fixed location within the threshold distance of the barcode scanner 116. Accordingly, at block 310, the server 104 may select as the subset, the camera 108-1 and the sensor 108-3, while excluding the camera 108-2, since the server 104 may determine that the camera 108-2 is not capable of capturing data representing the location of the barcode scanner 116.

Returning to FIG. 3, in some examples, some of the sensors 108 with which the server 104 may communicate may be controllable, for example to activate some sensors 108 not active at the time of the event indicator, or to control some sensors 108 to move to positions to capture data representing the location specified in the event indicator. Accordingly, in such examples, prior to block 310, the server 104 may proceed to block 308 to control a further subset of the sensors 108 to capture data representing the location specified in the event indicator, by moving, by initiating data capture at the sensor, or the like as appropriate. Subsequently, when the server 104 proceeds to block 310 to select the subset of sensors 108 capable of capturing sensor data representing the location specified in the event indicator, the controlled sensors 108 may additionally be included in the subset.

Figure 5:
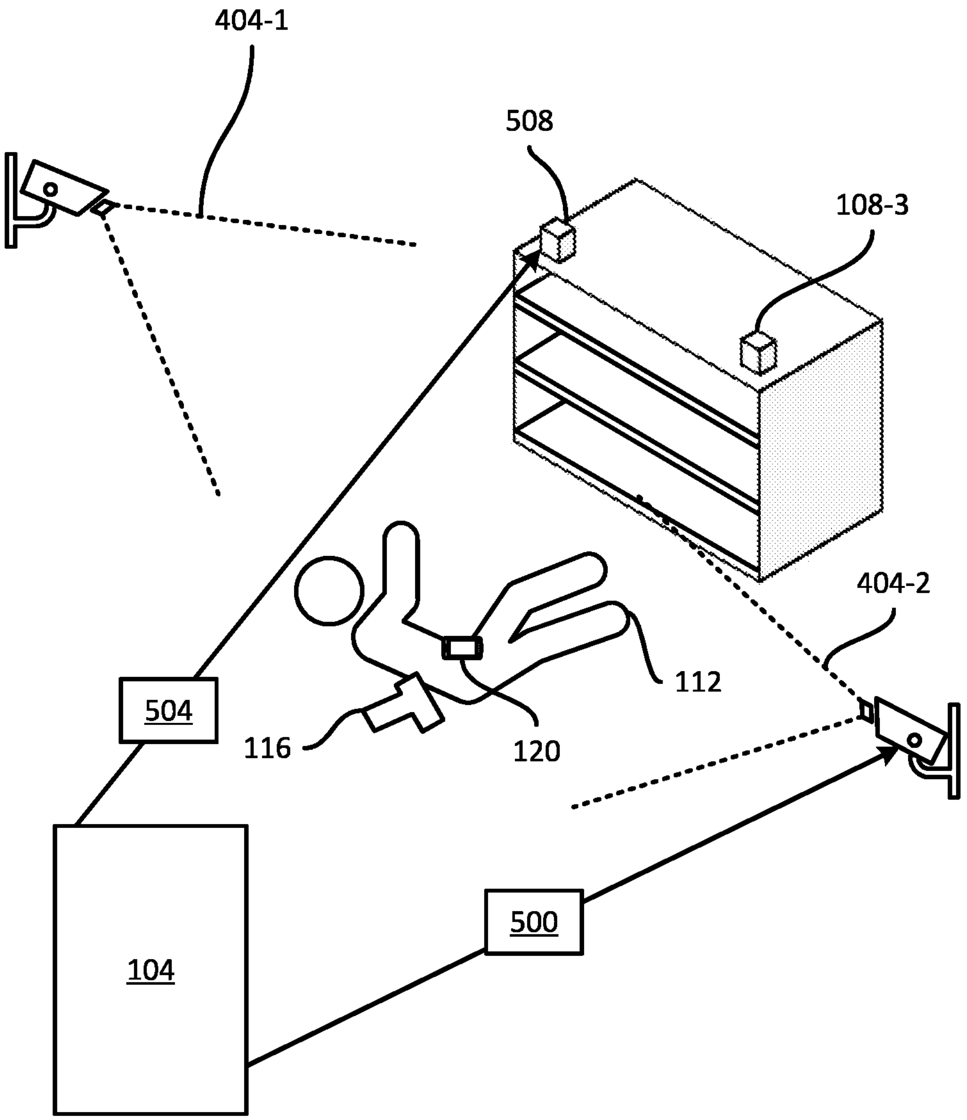
FIG. 5 is a schematic diagram of an example performance of block 308 of the method of FIG. 3.

For example, the camera 108-2 may be controllable, and accordingly, after receiving the event indicator 400, the server 104 may control the camera 108-2 to move to a position in which the location of the barcode scanner 116 falls within the FOV 404-2 of the camera 108-2, as illustrated in FIG. 5. For example, the server 104 may send control instructions 500 to the camera 108-2. The server 104 may then also include the camera 108-2 in the subset of sensors identified at block 310. The server 104 may additionally send control instructions 504 to an additional sensor 508 (e.g., a microphone or the like in a low-power state or otherwise not actively capturing data at the time the event indicator 400 was generated) to initiate data capture for a predefined duration following the timestamp in the event indicator 400.

Returning again to FIG. 3, at block 315, the server 104 retrieves sensor data for the subset of sensors identified at block 310. The server 104 may retrieve the sensor data from the repository 212, for example if the sensor data is regularly sent and stored at the server 104, or the server 104 may request the sensor data from the sensors 108. The server 104 may be configured to retrieve sensor data captured during a buffer period around the timestamp of the event indicator. The buffer period may be defined amount of time (e.g., 30 seconds, 1 minute, 5 minutes, etc.) before and/or after the timestamp of the event indicator. In particular, a fall event experienced by the user 112 may occur slightly prior to or slightly after the event indicator detected by the source sensor. Additional sensor data from shortly before the fall event may provide context for fall event as well as environmental fall hazards and/or predictors to allow for proactive preventative measures to be taken. Additional sensor data from shortly after the fall event may provide context as to the severity of the fall event and the environmental fall hazards.

At block 320, the server 104 correlates the sensor data retrieved at block 315. In particular, the server 104 may spatially correlate the sensors 108 in the subset spatially, for example based on predefined fixed locations of the sensors 108 and/or detected or determined locations of the sensors 108. The locations of the sensors may be detect or determined, for example based on triangulation of Wi-Fi signal strengths, object detection in the image data captured by one or more of the image sensors, or other suitable methods. The spatial correlation of the sensors 108 may include determining the relative FOVs, position, orientation, and the like. The server 104 may further determine a relative mapping between the FOVs to allow the association of an object captured in one FOV to the same object captured in another FOV.

The server 104 may additionally synchronize the sensor data in time, for example based on local timestamps at the sensors 108 at the time of capture. The time synchronization of the sensor data may allow correlation of sensor data captured, for example by the sensor 508, which was initiated only after the event indicator was received. The time synchronization may further allow correlation of sensor data captured, for example by the camera 108-2, for which only certain portions of the sensor data may be relevant (i.e., after control of the camera 108-2 to the position in which the barcode scanner 116 is in the FOV 404-2 of the camera 108-2). The sensor data may further be classified into time periods corresponding to before the event indicator, during the event indicator (e.g., if the event indicator is a freefall event, between a start and end of the detected freefall event), and after the event indicator.

At block 325, the server 104 analyzes the correlated sensor data to determine whether a candidate event is detected.

For example, the user 112 may have dropped the barcode scanner 116 without having fallen, resulting in detection of the freefall event indicator at the barcode scanner 116. Thus for example, the server 104 may apply image recognition methods to image data (e.g., captured by the camera 108-1) to determine whether the user 112 experienced a fall event. In other examples, the server 104 may analyze other types of data from the correlated sensor data, such as inductance signals detecting whether or not the barcode scanner 116 was dropped, audio signals detecting a crash or audible sounds of distress, and the like, to determine whether the user 112 experienced a fall event. Since a user-based fall event may have occurred slightly prior to or shortly after the event indicator, the buffer time may allow suitable detection of the candidate fall event.

The server 104 may be configured to apply a machine-learning based trained model to the correlated sensor data to determine whether a candidate fall event is detected. The trained model may be trained based on annotated data from fall and non-fall events, including classifications of fall events by severity, causes, and other factors.

In other examples, the barcode scanner 116 may not detect a freefall event while the user 112 did experience a fall event because the user 112 may not have dropped the barcode scanner 116 during the fall event. The event indicator in such an example may be a sound of distress captured by a nearby sensor, such as the sensor 108-3. The server 104 may therefore first determine a state of the barcode scanner 116 associated with the user 112 (or another device associated with the user 112, such as the mobile device 120), to determine whether the device was being carried, holstered, in pocket, or other relevant states at the time of the event indicator. For example, detection of a signal in an inductance sensor in the handle of the barcode scanner 116 may indicate that the barcode scanner 116 was carried at the time of the event indicator. In such examples, image data captured by the barcode scanner 116 may be used by the server 104 to identify the candidate fall event.

Figure 6:
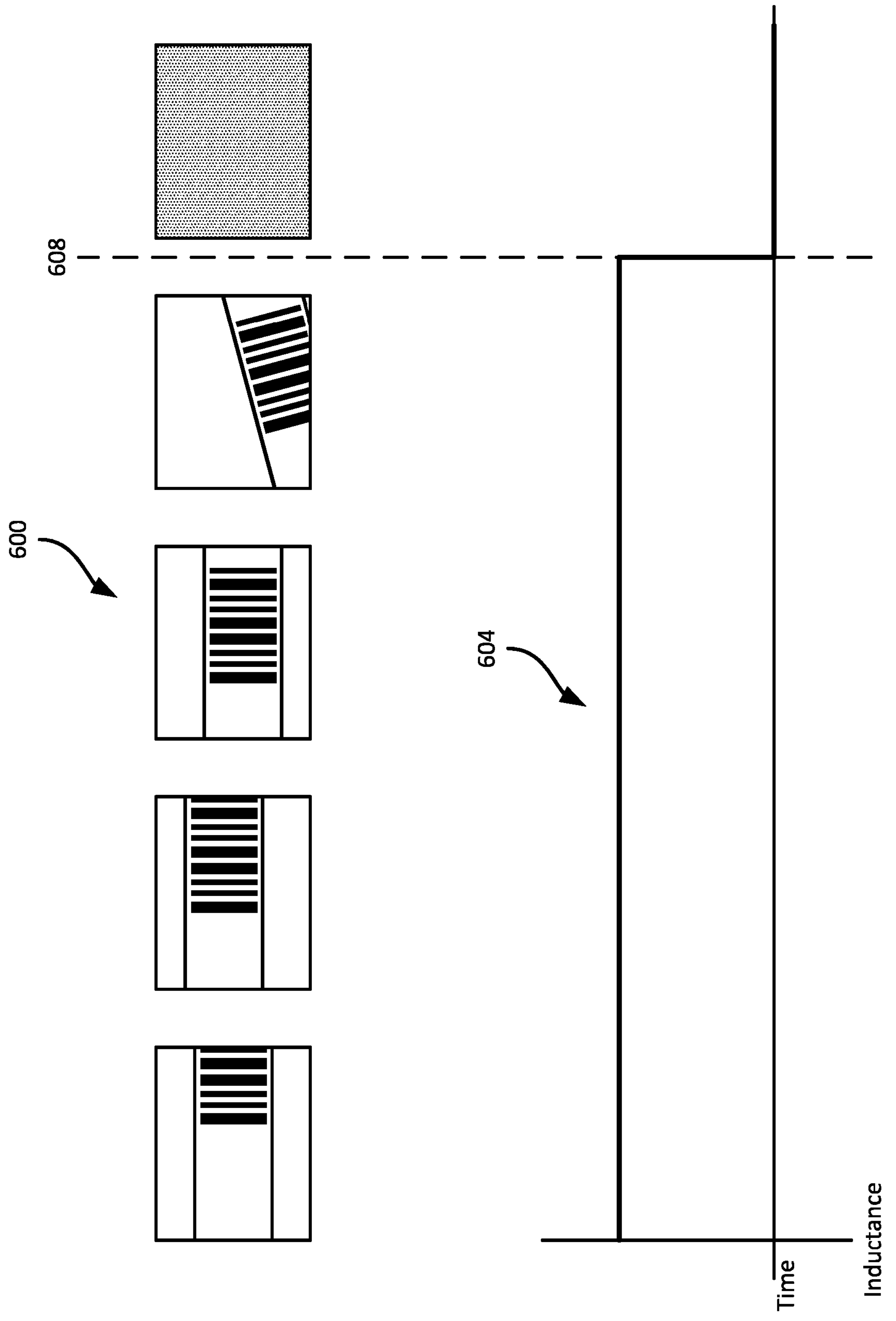
FIG. 6 is a schematic diagram of example sensor data obtained at block 315 of the method of FIG. 3.

For example, referring to FIG. 6, the image data 600 over time may depict a generally steady image of a barcode to be scanned, followed by a short period of rapid change in the image data and a lack of signal (e.g., indicating that image data is no longer being captured for example due to lack of actuation of the image sensor by a user). The inductance sensor data 604 may depict detection of an inductive signal in the handle of the barcode scanner 116 until a time 608 corresponding to the lack of signal in the image data. Thus, based on the rapid change in image data and the subsequent lack of signal, as well as the lack of inductive signal In some examples, the state of the barcode scanner 116 may additionally be used to select an appropriate trained model corresponding to the state of the barcode scanner 116 or other device. That is, devices may generally detect different data (e.g., accelerometer data, image data, etc.) during fall events depending on their state. Accordingly, detection of the state of the device prior to applying the trained model may increase the robustness of the detection of the candidate fall event.

If at block 325, the server 104 does not identify a candidate fall event, then the method 300 ends. That is, the server 104 may determine that based on the sensor data captured at the time of the event indicator, the event indicator may have been isolated and not related to a fall event experienced by the user 112. In some examples, some or all of the correlated sensor data may be stored by the server 104 for further analysis related to user behavior parameters, other potential fall hazards, impacts of a device freefall event on other users, equipment, the device itself, and the like.

If at block 325, the server 104 does identify a candidate fall event, then the method 300 proceeds to block 330. At block 330, the server 104 sends an event confirmation request to a device associated with the user 112 who experienced the fall event. For example, the server 104 may identify the mobile device 120 as being associated with the user 112. An associated device may be identified based on the source sensor which detected the event indicator, based on a corresponding identifier (e.g., if the barcode scanner 116 which detected the event indicator is associated with the mobile device 120 to allow interaction with the user 112), based on triangulation of signals near the location of the event indicator, and other suitable methods. The event confirmation request may be configured to request confirmation of the candidate fall event from the user 112.

If the server 104 receives a negative response to the event confirmation request at block 330, then the method proceeds to block 335. At block 335, the server 104 annotates the correlated sensor data to indicate that no fall event occurred and returns the annotated sensor data to the machine-learning based model as further training data to enhance the trained model. In some examples, the trained model may be trained to recognize the impact of the event indicator on other devices, users, or items. In some examples, the server 104 may abort sending a default event notification generated, for example, in response to detecting the candidate event.

If the server 104 receives an affirmative response to the event confirmation request at block 330, then the method 300 proceeds to block 340. At block 340, the server 104 obtains event details for the confirmed fall event. For example, the server 104 may request a severity classification from the user 112, a cause of the fall event, any injuries sustained during the fall event and the like. In some examples, depending on the severity and type of injuries sustained during the fall event, the server 104 may provide additional follow-up wellness question, for example as a basic concussion assessment or the like. The server 104 may also provide to the user 112 via the mobile device 120 suggested treatments and actions to undertake based on the event details identified by the user 112.

At block 345, the server 104 may aggregate the event details obtained at block 340 and send an event notification, for example to a client device associated with medical and/or assistive services, managerial staff, or the like. The event notification may include the event details obtained at block 340, as well as the time of the fall event (e.g., as identified based on the event indicator), and may additionally include relevant sensor data (e.g., an image representative of the fall event).

After completion of block 345, the method 300 proceeds to block 335 to annotate the correlated sensor data. In particular, the sensor data may be annotated to confirm that a fall event did occur, as well as the event parameters and details obtained at block 340, for example pertaining to severity, sustained injuries and the like. The annotated sensor data may be returned to the machine learning model as further training data to enhance the trained model, including to allow prediction of the severity of falls, potential injuries, proactive preventative measures, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A server comprising:

a memory configured to store sensor data from a plurality of sensors in a facility;

a communications interface; and a processor interconnected with the memory and the communications interface, the processor configured to:

in response to receiving, via the communications interface, an event indicator from a source sensor of a client device:

identify a subset of the plurality of sensors based on the event indicator;

retrieve and correlate the sensor data from the identified subset of the plurality of sensors in the facility;

detect a candidate event associated with a user of the client device from the correlated sensor data; and when the candidate event is detected, send an event notification to the client device.

2. The server of claim 1, wherein the event indicator includes a location associated with the source sensor and a timestamp for the event indicator.

3. The server of claim 2, wherein the processor is configured to select the subset of sensors capable of capturing sensor data representing the location specified in the event indicator.

4. The server of claim 2, wherein the processor is configured to retrieve sensor data captured during a buffer period around the timestamp of the event indicator.

5. The server of claim 1, wherein the processor is configured to spatially correlate the sensor data and synchronize the sensor data in time.

6. The server of claim 1, wherein, prior to sending the event notification, the processor is configured to:

send an event confirmation request to the client device; and in response to a negative response to the event confirmation request, abort the event notification.

7. The server of claim 6, wherein the processor is further configured to, in response to an affirmative response to the event confirmation request, obtain event details from the client device associated with the user.

8. The server of claim 6, wherein the processor is further configured to annotate the sensor data based on a response to the event confirmation request and return the annotated sensor data to a trained model.

9. The server of claim 1, wherein the processor is configured to apply a trained model to the correlated sensor data to detect the candidate event.

10. The server of claim 1, wherein the candidate event comprises a user fall event.

11. A method comprising:

storing sensor data from a plurality of sensors in a facility;

in response to receiving an event indicator from a source sensor of a client device:

identifying a subset of the plurality of sensors based on the event indicator;

retrieving and correlating the sensor data from the identified subset of the plurality of sensors in the facility;

detecting a candidate event associated with a user of the client device from the correlated sensor data; and when the candidate event is detected, sending an event notification to the client device.

12. The method of claim 11, wherein the event indicator includes a location associated with the source sensor and a timestamp for the event indicator.

13. The method of claim 12, further comprising selecting the subset of sensors capable of capturing sensor data representing the location specified in the event indicator.

14. The method of claim 12, further comprising retrieving sensor data captured during a buffer period around the timestamp of the event indicator.

15. The method of claim 11, further comprising spatially correlating the sensor data and synchronizing the sensor data in time.

16. The method of claim 11, further comprising, prior to sending the event notification:

sending an event confirmation request to the client device; and in response to a negative response to the event confirmation request, aborting the event notification.

17. The method of claim 16, further comprising, in response to an affirmative response to the event confirmation request, obtaining event details from the device associated with the user.

18. The method of claim 16, further comprising annotating the sensor data based on a response to the event confirmation request and returning the annotated sensor data to a trained model used to detect the candidate event.

19. The method of claim 11, further comprising applying a trained model to the correlated sensor data to detect the candidate event.

20. The method of claim 11, wherein the candidate event comprises a user fall event.

* * * * *